United States Patent
Maslar

(10) Patent No.: US 8,322,133 B2
(45) Date of Patent: Dec. 4, 2012

(54) EXTERNALLY ADJUSTABLE MODULAR TUNED EXHAUST SYSTEM

(76) Inventor: David Maslar, Gambrills, MD (US)

(*) Notice: Subject to any disclaimer, the term of this patent is extended or adjusted under 35 U.S.C. 154(b) by 791 days.

(21) Appl. No.: 12/379,969

(22) Filed: Mar. 5, 2009

(65) Prior Publication Data

US 2009/0313981 A1 Dec. 24, 2009

Related U.S. Application Data

(60) Provisional application No. 61/064,441, filed on Mar. 5, 2008.

(51) Int. Cl.
F02B 27/02 (2006.01)
F01N 1/00 (2006.01)

(52) U.S. Cl. .......... 60/314; 60/312; 60/322; 60/324

(58) Field of Classification Search .......... 60/312, 60/314, 322, 324; 181/212, 215, 216, 227, 181/228, 241
See application file for complete search history.

(56) References Cited

U.S. PATENT DOCUMENTS

| | | |
|---|---|---|
| 2,242,604 A | 5/1941 | Wells |
| 2,382,159 A | 8/1945 | Klemm |
| 2,459,918 A | 1/1949 | Chester |
| 2,661,523 A | 12/1953 | Walker |
| 3,141,519 A | 7/1964 | Bottum |
| 3,253,676 A | 5/1966 | Bottum |
| 3,581,842 A | 6/1971 | Hall |
| 3,670,844 A | 6/1972 | Penfold, Jr. |
| 3,703,937 A | 11/1972 | Tenney |
| 3,726,092 A | 4/1973 | Raczuk |
| 3,969,895 A | 7/1976 | Krizman |
| 4,537,279 A * | 8/1985 | Van Heeckeren ............ 181/241 |
| 4,715,472 A | 12/1987 | McKee |
| 5,214,254 A | 5/1993 | Sheehan |
| 5,224,739 A | 7/1993 | Sauter |
| 5,579,638 A | 12/1996 | Archer |
| 5,746,054 A | 5/1998 | Matte |
| 5,785,014 A | 7/1998 | Cornwell |
| 6,520,285 B2 | 2/2003 | Tobias |
| 2003/0136121 A1 | 7/2003 | Pierkarski |
| 2003/0145584 A1 | 8/2003 | Ciray |
| 2003/0145585 A1 | 8/2003 | Uhler et al. |
| 2006/0243822 A1* | 11/2006 | Maslar ................ 239/265.35 |

FOREIGN PATENT DOCUMENTS

| | | | |
|---|---|---|---|
| GB | 2190956 A | * | 12/1987 |
| GB | 2321498 A | * | 7/1998 |
| JP | 57-76220 | | 5/1982 |

* cited by examiner

*Primary Examiner* — Binh Q Tran
*Assistant Examiner* — Audrey K Bradley
(74) *Attorney, Agent, or Firm* — Tangent Law Group, PLLC; Eric J. Weierstall, esq.

(57) ABSTRACT

A modular tuned exhaust pipe coupled to a remote controlled vehicle having a two stroke motor, having a body portion with an exhaust port. A convergent cone section is internally and slidingly mounted within the body portion and has an at last one exhaust hole. An adjustment Mechanism coupled to the convergent cone section. The turning of the adjustment mechanism slidingly moving the convergent cone within the body portion to adjust the tuned length of the modular tuned exhaust pipe. And a pressure adjustment screw, the pressure adjustment screw penetrating the body portion such that turning of the pressure adjustment screw increases or decreases the pressure within the modular tuned pipe.

9 Claims, 7 Drawing Sheets

GAS FLOW DIAGRAM

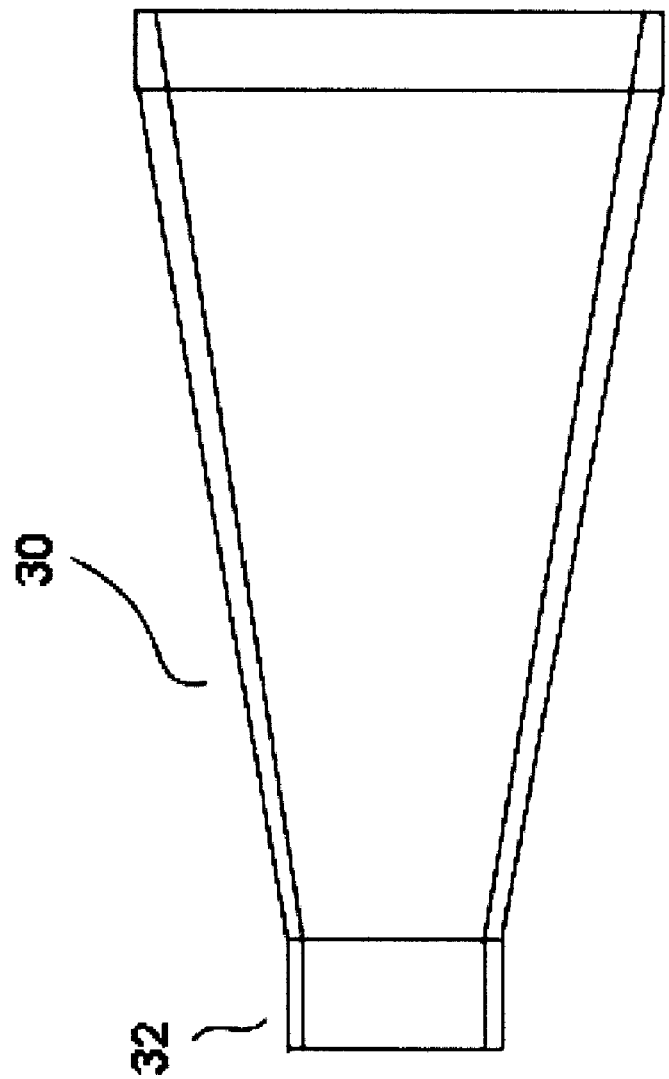

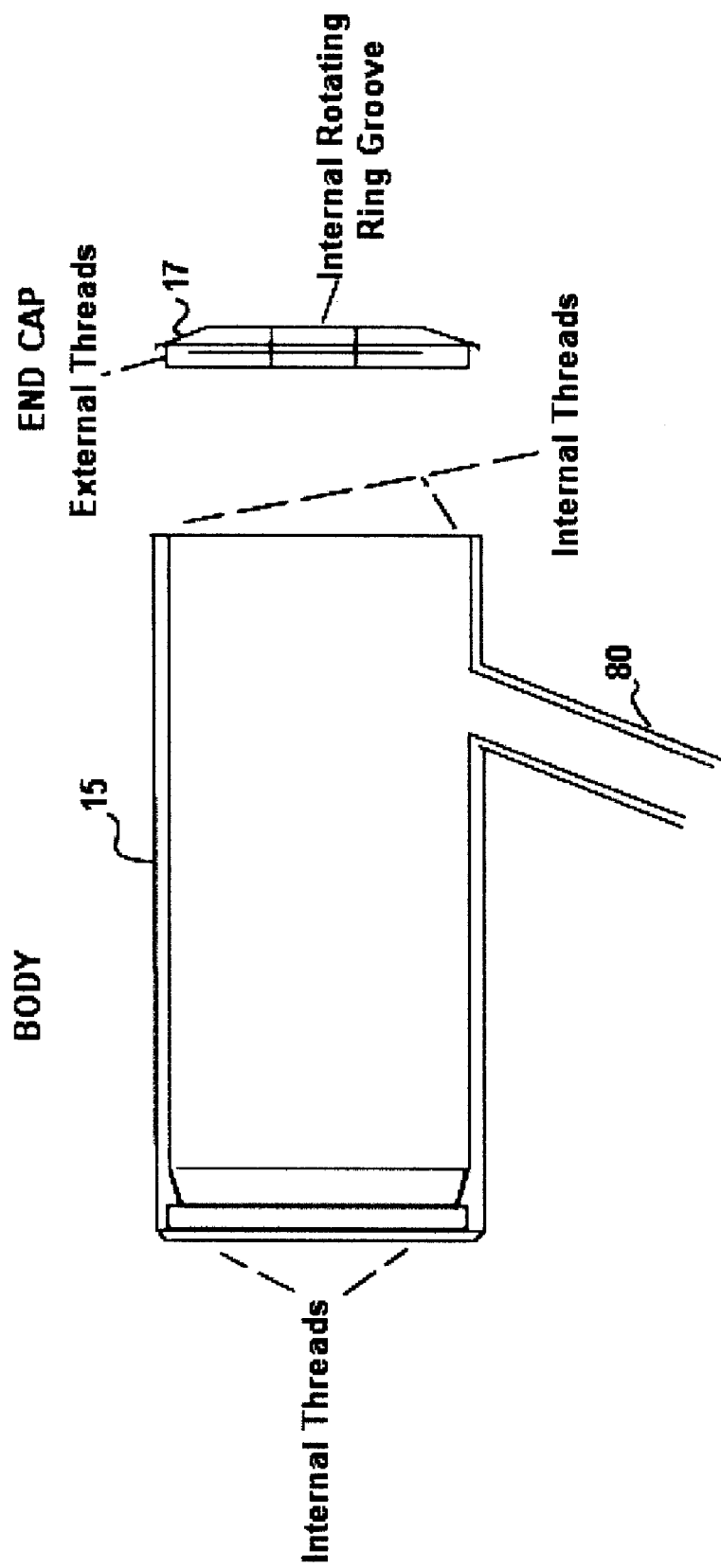

GAS FLOW DIAGRAM

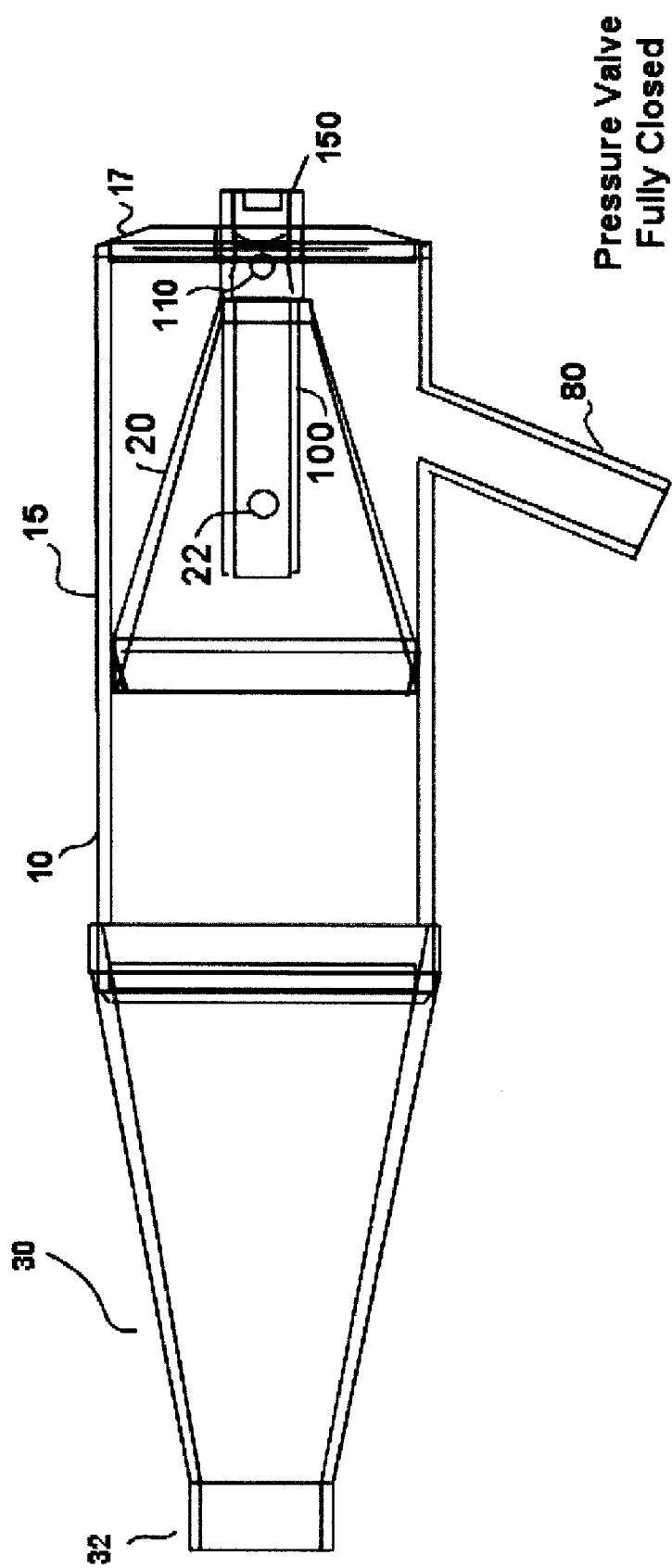

EXTERNALLY ADJUSTABLE MODULAR TUNED EXHAUST SYSTEM

CROSS REFERENCE TO RELATED APPLICATIONS

This application claims priority to U.S. provisional patent application 61/064,441, filed Mar. 5, 2008, which is incorporated herein by reference.

FIELD OF THE INVENTION

The invention relates to an apparatus and system for adjusting the tuned length of an exhaust system. More specifically, an exhaust system that uses variations in geometry of a convergent and divergent cone in relation to one another in connection with the speed of the engine and corresponding exhaust gasses to adjust the length of the overall tuned length of the exhaust system.

BACKGROUND OF THE INVENTION

It is a well-established concept in engine design that an increase the performance of an internal-combustion, reciprocating engine can be achieved through various improvements in the exhaust system. One way to improve an exhaust system has been to utilize pressure variations developed within an exhaust system, typically through changing backpressure and resonance, to supplement the control of gases moving within the engine and its exhaust and thereby modify the pressure and pressure waves to improve engine performance. An exhaust system may develop some rather substantial pressures that are both positive and negative with reference to the ambient and these pressures may be effectively harnessed to accomplish more desirable movement of gases through the engine.

It has also been determined that the design considerations for an exhaust system include the operating speed of the engine. Generally, the significance of speed may be somewhat more apparent with the recognition that the exhaust system receives gas pulses, the frequency of which is directly related to the operating speed of the engine.

This is especially true of a two-stroke engine, such as a motorcycle engine or glow ignition two-stroke engine, a type typically found in hobby craft. The two-stroke engine has a single "breathing" cycle, wherein the exhausted gasses pass out of the cylinder and fresh air-gas mixture is taken into the cylinder simultaneously. Essentially, it is desirable to provide a negative pressure at the engine exhaust port during the interval when both the exhaust and intake ports are fully open, so as to more effectively draw a charge of fresh air-gas mixture into the cylinder. Subsequently, as the exhaust port closes it is desirable to provide a positive pressure to restore and maintain the fresh charge of airgas in the cylinder and initiate compression.

Previous efforts at exhaust systems have attempted to provide such pressure variations; however, these efforts have all fallen short due to the complex design considerations. These solutions suffer from significantly increased sizes and weights, characteristics that detract from the performance gains that such solutions provide. Moreover, the vast majority of previous designs do not provide for adequate and convenient adjustment of tuned length. Instead, these designs rely on inaccurate mechanical and manual controls or limited automatic controls, if any at all, that cannot make adjustments during a race or active use.

Generally, applications for exhaust systems for such engines involve a demand for high performance yet, are so varied that flexibility is required. This is particular significant as the size of the engine decreases, e.g., two cycle motorcycle engines versus glow ignition two stroke engines. As the lengths of the acceptable variations and degree of control over these variations moves from the scale of centimeters to millimeters, accurate control becomes increasingly important, as does reducing size and weight. None of the existing designs has been able to provide a satisfactory combination of these important characteristics.

For example, U.S. Pat. No. 2,459,918 to Chester shows a size adaptation system, suitable for use in adapter exhaust pipe extensions to automobile exhaust or tail pipes of different sizes. The structure involves a tubular member, which is slidingly fitted to the exhaust pipe and is equipped with a spring for resisting its forward sliding movement. This design simply provides for movement of the pipe length relative to a bumper, as a means of protecting the pipe. It does not provide for adjustment, much less quick adjustment of the tuned length of the exhaust system. Nor does it provide for manipulation of the convergent and divergent portions of an exhaust in unison or variation in the geometry of such sections to vary either the angle of expansion or the angle of convergence in these sections.

In U.S. Pat. No. 3,703,937 to Tenney, an expansion chamber exhaust system for two-cycle engines with a valve that shifts position from a low RPM position to a high rpm position to provide a positive pressure wave in the exhaust chamber. This adjusts the volume of the chamber and the characteristics of the pressure wave to suit set RPM characteristics. However, the additional components add significant weight to the overall system and require modifications to provide a dual path exhaust chamber. Moreover, this system is overly complex, requiring switching between low and high RPM chamber flows. It is also limited in its RPM response, therefore limiting its overall performance. It also fails to change tuned length. Finally, the reference does not teach nor suggest the movement of both the header or divergent and belly or convergent sections or variation of the relative geometries to vary either the angle of expansion or the angle of convergence in these sections.

Another attempt is provided in U.S. Pat. No. 3,726,092 to Raczuk, which shows an exhaust system for a combustion engine, having an exhaust port with a cylindrical length. In the second embodiment, the cylindrical length has a generally conic convergent section coupled to it and contains a generally conic divergent section slidably received within it at one end. A spring is used to urge the internal conical divergent section along the cylindrical length toward the engine to vary the size of the exhaust. A manual actuator pushes the spring and, thereby, the internal conical divergent section down various positions in the cylindrical length toward the convergent section for different operating speeds of the engine.

Several problems arise in the operation of such a device. For instance, the operator needs to make constant adjustments to the exhaust to change its length. This can tax the ability of the operator to simultaneously change the exhaust length and control the vehicle. Moreover, there are significant problems in using this on small scale vehicles, such as hobby craft. In many instances the operator of these types of vehicles is not traveling on the vehicle and operator adjustment is thus impossible. This design also suffers from significant additional weight due to the control mechanism and cannot be accurately adjusted across a wide range of RPMs, just those for which the controller is pre-positioned.

U.S. Pat. No. 3,969,895 to Krizman describes a power control valve attachment provided for assembly on an existing two-cycle engine exhaust system. The system increases back pressure by providing a perforated section with an end cap that is held within the exhaust pipe. The relative pressure from the engine pushes against the end cap, extending the perforated section out from the exhaust pipe. A spring prevents the system from falling out of the exhaust during operation. In this design, the tuned length of the exhaust system is not truly adjusted. Only the backpressure within the system is increased by obstruction with the end cap. Thus, performance gains are marginal and tuned length is not adjusted over a range of RPMs. Furthermore, the relative movement of both a divergent and/or convergent section is not considered in this design.

Similarly, U.S. Pat. No. 5,785,014 to Cornwell provides for movement of the exhaust controlled by exhaust pressure, but it does so by obstructing the flow of exhaust gases in a similar, albeit more complicated, manner as that of Krizman. This and similar patents provide for a variety of components to reduce the flow cross-section of the exhaust and increase backpressure, however, each falls short in that the reduction in the flow of the exhaust drops peak performance and reduces power at the highest RPM levels, specifically the RPM range beyond the peak power level, where exhaust pressures drop and a restriction in the flow or cross-sectional flow area is highly detrimental to performance.

In U.S. Pat. No. 4,715,472 to McKee an adjustable motorcycle muffler with a stationary ring and an adjustable ring at an exit end is provided. The adjustable ring is movable relative to the stationary ring to vary the amount of gas flow. Again, this increases the back pressure but does not provide for adjustment of the tuned length of the exhaust system, thus, performance gains are marginal and tuned length is not adjusted. Furthermore, the design fails to move either a belly or convergent cone or a header or divergent cone section, much less move these elements simultaneously.

The U.S. Pat. No. 5,214,254 to Sheehan discloses a triple cone exhaust for controlling both flow and resonance within the exhaust. The triple cone has a tubular perforated sleeve, a tubular perforated tuning pipe with a conical end, and a reverse cone megaphone enclosure with the inlet and outlet of the exhaust on either end. The orifice size, and thereby the resonance of the system, can be adjusted by turning the sleeve. Again, the tuned length of the system is not adjusted in this solution. Instead the resonance of the pressure wave within the system is adjusted by adjusting the "noise" level created within the exhaust, that is the pressure exerted by sound waves within the exhaust. It does not adjust either the length of a divergent or the convergent cone section.

In U.S. Pat. No. 5,218,819 to Cruickshank provides an exhaust system with a variable volume by displacement of a baffle member in a baffle chamber. The volume of the chamber is increased by a baffle that opens and adds volume to the chamber. Although this may change the pressure wave within the system, it does not provide for adjustment of the tuned length of the system. Additionally, by simply adding volume in this fashion to manipulate the pressure wave it results in a larger overall exhaust, adding weight that detracts from performance gains. In addition, although the overall volume of the exhaust may be varied, the critical parts in developing the pressure waves, namely those elements like the convergent and divergent cones that produce pressure wave reflections, are not being efficiently manipulated. As the convergent and divergent cone sections are not manipulated and the system is utilizing a larger bore exhaust, its performance is diminished significantly.

U.S. Pat. No. 6,520,285 shows an adjustable muffler system for attachment to an engine exhaust system and method of adjusting or tuning the volume level of the sound emitted from an engine muffler. Again, this does not provide for dynamic adjustment of the tuned length of the exhaust system. Instead, it allows for the adjustment of the resonance or sound within the exhaust, which has little functional application to performance improvement. It also fails to manipulate either a divergent or convergent cone section to do this.

Thus, these prior attempts are inadequately addressing the problem of quickly and conveniently adjusting the tuned length of an exhaust system to provide for increased performance across a wide range of applications and engine speeds. Additionally, the heretofore known devices fail to provide for modular construction that would speed repair and replacement in situations such as racing of hobby craft and the like. In these situations rapid replacement of a modular component during competition can mean winning or losing the race. Moreover, quick adjustments during pit stops and the like would also need to be facilitated. Consequently, a need exists for an improved, more flexible modular and quickly adjustable tuned exhaust system that may be more uniformly used on a wide variety of small engines and which is capable of accomplishing improved operating performance at various engine speeds while allowing for rapid replacement, adjustment or replacement and adjustment in a vehicle.

SUMMARY OF THE INVENTION

An object of the invention is to provide a high-performance, easily and quickly adjusting, tuned exhaust system that is small, lightweight and easy to manufacture and engage.

An object of the invention is to provide for a quick mechanical adjustment of the geometry of a divergent section to vary the angle of expansion within the section and thereby the tuned length of the exhaust, this adjustment being easily completed from external manipulation of a control element.

Yet another object of the invention is to provide for dynamic adjustment of the geometry of a divergent section to vary the angle of convergence within the section, alone or in combination with variations in the angle of divergence in the divergent section.

A still further object of the invention is to provide for a high performance, adjustable tuned exhaust system that varies the length of a divergent and convergent cone based on a single, quickly engaged manual control or adjustment input.

An object of the invention is to a modular design to a modular tuned exhaust pipe that is easily removed, repaired, and/or replaced.

An object of the invention is to provide a modular tuned exhaust pipe that provides for easy adjustment of tuned length and pressure within the pipe to accommodate a variety of environmental and non-environmental conditions.

The invention includes an article of manufacture, an apparatus, a method for making the article, and a method for using the article.

A further object of the invention is to provide an exhaust system that can be more uniformly used on small engines and is capable of accomplishing improved operating performance at various engine speeds and meets guidelines of the governing bodies of hobby craft racing bodies, specifically the remote control or RC car racing bodies. The invention addresses the desirability of adjusting both the tuned length and the operating pressure of a 2-stroke exhaust system, both factors in the performance of motor. Because of the nature of competition, the adjustment must be readily accessible and it is most desirable that it be adjustable without stopping the motor. This is due to the need to actively and quickly tune the exhaust system during potentially short practice sessions in a competitive event. The adjustments address the need of a driver to finely tune the performance of the motor to unique and changing track conditions that may have not been previously experienced or anticipated.

Specific to radio controlled racing, currently the only way to alter the performance of a motor to better suit track geometry or conditions is to remove and change the "tuned pipe" or exhaust system on the vehicle. This is both time consuming and the resulting change in performance characteristics is likely to be abrupt, due the substantial differences in various pipes geometry. In addition, because the fuel system is pressurized by a direct exhaust system pressure line, the pipe change will likely result in the necessity of re-tuning the motors' jetting due to the differing operating pressures created by the differing pipes. This re-tuning can also be a time intensive further reducing the desirability of changing exhaust during limited practice sessions.

The invention allows a driver to finely adjust the performance characteristics of the motor in a quick and precise manner. In addition, the pressure adjustment provides for a far more precise method of controlling the jetting of the motor. This is due to the stated relationship of the exhaust system pressure and the fuel system. By finely adjusting the operating pressure, the jetting can be manipulated in a manner that is far more precise than the carburetor adjustments. This provides an additional advantage to the racer, as running a motor at the leanest setting possible is beneficial to the driver by increasing run time per tank of fuel, fuel tank capacities being strictly regulated by the governing bodies.

The invention must also comply with the major sanctioning body's rules and regulations for competition. Currently there are numerous national and international bodies, but the primary bodies in the U.S. are the R/C Pro Series, and ROAR. Both of these bodies prohibit dynamically moving components in the exhaust. R/C Pro by a direct language prohibition; Rule 66 of R/C Pro rules and regulations, incorporated herein by reference. This rule has already been interpreted as to mean "dynamically" moving exhaust components and the instant invention has already been approved for competition in R/C Pro events.

ROAR prohibits dynamically moving exhaust components by use of a prohibition of "Variable Engine Timing." This clause has been invoked to prohibit dynamic exhaust components previously. The instant invention has been reviewed approved by the current ROAR President, Vice President, Competition Director, Technical Director and several Nitro Committee members. In addition, the inherent characteristics of the design do not make it incompatible with the rules and regulations of the international sanctioning body, IFMAR.

The invention includes a system, apparatus and a method of operation of the system and apparatus.

The apparatus and system includes a body portion having an exhaust port and an inlet port, a header coupling the body portion to a two stroke motor on a remote controlled vehicle with an end cap at an end of the body portion closest to the exhaust port.

A convergent cone section is internally and slidingly mounted within the body portion and has an at least one exhaust hole therein. An external adjustment screw/mechanism is provided, the adjustment screw/mechanism being coupled to the convergent cone section. Turning of the adjustment screw/mechanism imparts moves the slidingly moving convergent cone within the body portion to adjust the tuned length of the modular tuned pipe.

The modular tuned exhaust pipe can also include a divergent cone section coupled between the header coupling and the body portion. The adjustment mechanism can be an adjustment screw and the adjustment screw is coupled to the convergent cone section such that turning the adjustment screw moves the convergent cone slidingly in a lateral direction within the body portion relative to the divergent cone section to change the tuned length, the distance between the convergent and divergent cones of the exhaust, and thereby the motors performance characteristics.

The modular tuned exhaust pipe can also include a pressure adjustment screw, the pressure adjustment screw penetrating the body portion such that turning of the pressure adjustment screw increases or decreases the pressure within the modular tuned exhaust pipe. The modular tuned exhaust pipe can also include a pressure adjustment screw that is adjusted to open or close an at least one bypass hole. The pressure adjustment screw can be contained within the adjustment screw and the adjustment screw has at least one bypass hole, whereby exhaust gasses are permitted to flow down the adjustment screw and through the at least one gas bypass hole and the turning of the pressure adjustment screw closes at least partially or completely the at least one bypass hole within the screw and changes the pressure within the exhaust. The body portion, the convergent cone, the end cap, and the adjustment mechanism can be releasably coupled together such that they may be quickly disassembled and individual components replaced.

The modular tuned exhaust pipe can also include a counter rotation mechanism. The counter rotation mechanism cane be a rod. The rod can project from the end cap off a center of the end cap and penetrates the convergent cone such that the rod prevents rotation of the convergent cone in relation to the end cap but allows the convergent cone to slide within the body portion in response to the rotation of the adjustment screw.

The body portion, end cap, and convergent cone can also be non-circular. The counter rotation mechanism can thus also be the geometry of the body portion and the convergent cone, such that the geometry prevents rotation of the convergent cone in relation to the end cap but allows the convergent cone to slide within the body portion in response to the rotation of the adjustment screw.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations that would be apparent to those skilled in the art.

BRIEF DESCRIPTION OF THE DRAWINGS

Embodiments of the invention are explained in greater detail by way of the drawings, where similar reference numerals refer to the similar features.

FIG. 1A shows a cross-section of an exemplary embodiment of the divergent cone of the instant invention.

FIG. 1B shows a cross-section of an exemplary embodiment of the body portion of the instant invention.

FIG. 3B shows an exemplary embodiment of the instant invention adjusted to a maximum tuned length.

DETAILED DESCRIPTION OF THE INVENTION

Overall the instant invention will allow for the quick and easy adjustment of the exhaust system to not only dramatically change the performance characteristics but to additionally allow for fine tuning without removing the exhaust from the vehicle. In addition the modular threaded design will allow for the replacement of damaged components on an individual basis.

Figure 1C:
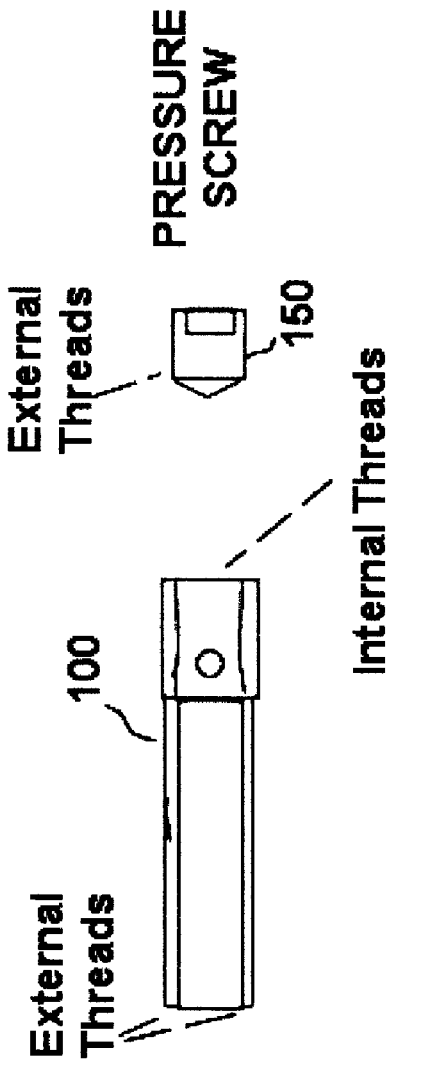
FIG. 1C shows a cross-section of an exemplary embodiment of the convergent cone, adjustment screw and pressure screw of the instant invention.

FIGS. 1A-1B show the elements of the instant invention. A modular tuned pipe or exhaust 10 is provided, constructed from any suitable material. The modular tuned pipe 10 has a body portion 15. The body portion 15 has a header coupling 32 at an inflow end taking in exhaust from the motor. The body portion 15 has an end cap 17 at the opposing end. The end cap 17 is removably coupled to the body portion 15, for instance through a threaded coupling, such that it is easily removed and replaced. Similar easily removable couplings are used throughout the tuned pipe 10.

Within the body portion 15, a convergent cone 20 is shown. Within the convergent cone 20 at least one exhaust hole or port 22 is provided. Coupled to the convergent cone 20 is a divergent cone 30, the gas flows in from the divergent cone 30 as shown and further described in FIG. 2. The divergent cone 30 is coupled to the motor via a header coupling 32. The convergent cone 20 in the exemplary embodiment is moved laterally within the body portion 15 to change the tuned length of the exhaust and thereby the motors performance characteristics, as further shown in FIGS. 3A and 3B.

This movement is accomplished by the turning of an externally projecting adjustment mechanism or screw 100. As shown in the exemplary embodiment of FIGS. 1C, 2. and 3A-3B the adjustment screw 100 is coupled to the convergent cone 20. The adjustment screw 100 contains threads on the external portion, which mate with the internal threads located inside the end of the convergent cone 20. The adjustment screw is secured into the end cap 17 by use of a wire retaining ring or any other suitable means. It may also be sealed by a silicone o-ring, for example. Thus a fine adjustment of the position of the internal convergent cone 20 and thereby the "tuned length" of the exhaust can be accomplished quickly and without the removal of the pipe from the vehicle. The adjustment of the position of the internal convergent cone can be seen in the contrast of the FIGS. 3A and 3B, showing a minimum tuned length and a maximum tuned length respectively.

In addition a pressure adjustment screw 150 can be turned to vary the operating pressure within the pipe to fine tune for different motors. The pressure adjustment is accomplished by the turning of a pressure adjustment screw 150 located within the adjustment screw 100 in the exemplary embodiment, however the pressure screw could be equally located and exist as a separate element without departing from the spirit of the invention. In the exemplary embodiment, as the pressure screw 150 is turned in it gradually closes off an at least one gas bypass hole 110 located in the adjustment screw 100. This allows for a fine adjustment of the operating pressure within the entire modular tuned pipe 10 without removing the pipe from the vehicle.

Figure 2:
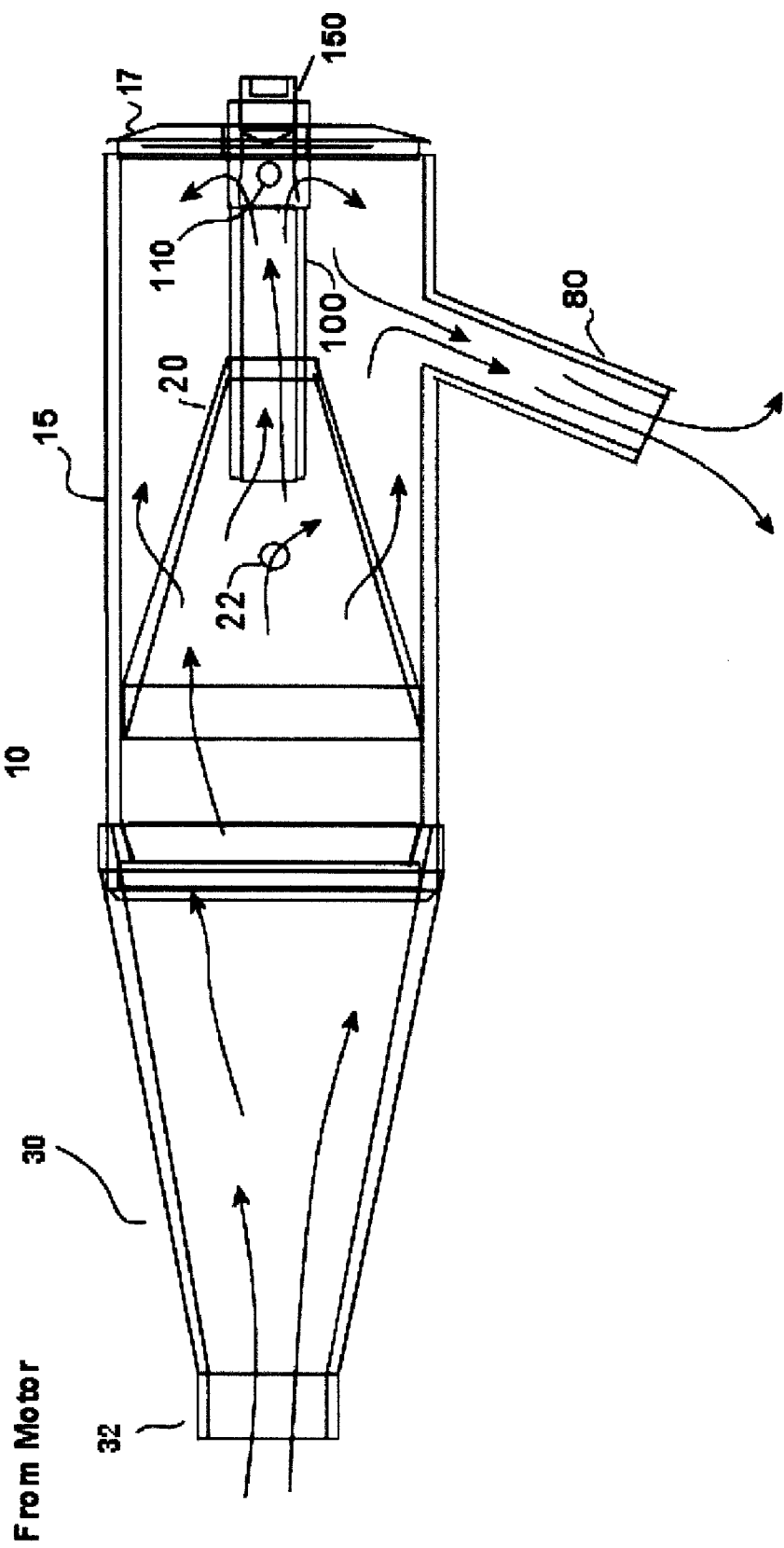
FIG. 2 shows an exemplary embodiment of the instant invention assembled and illustrates the path of exhaust gas through the invention.
Figure 3A:
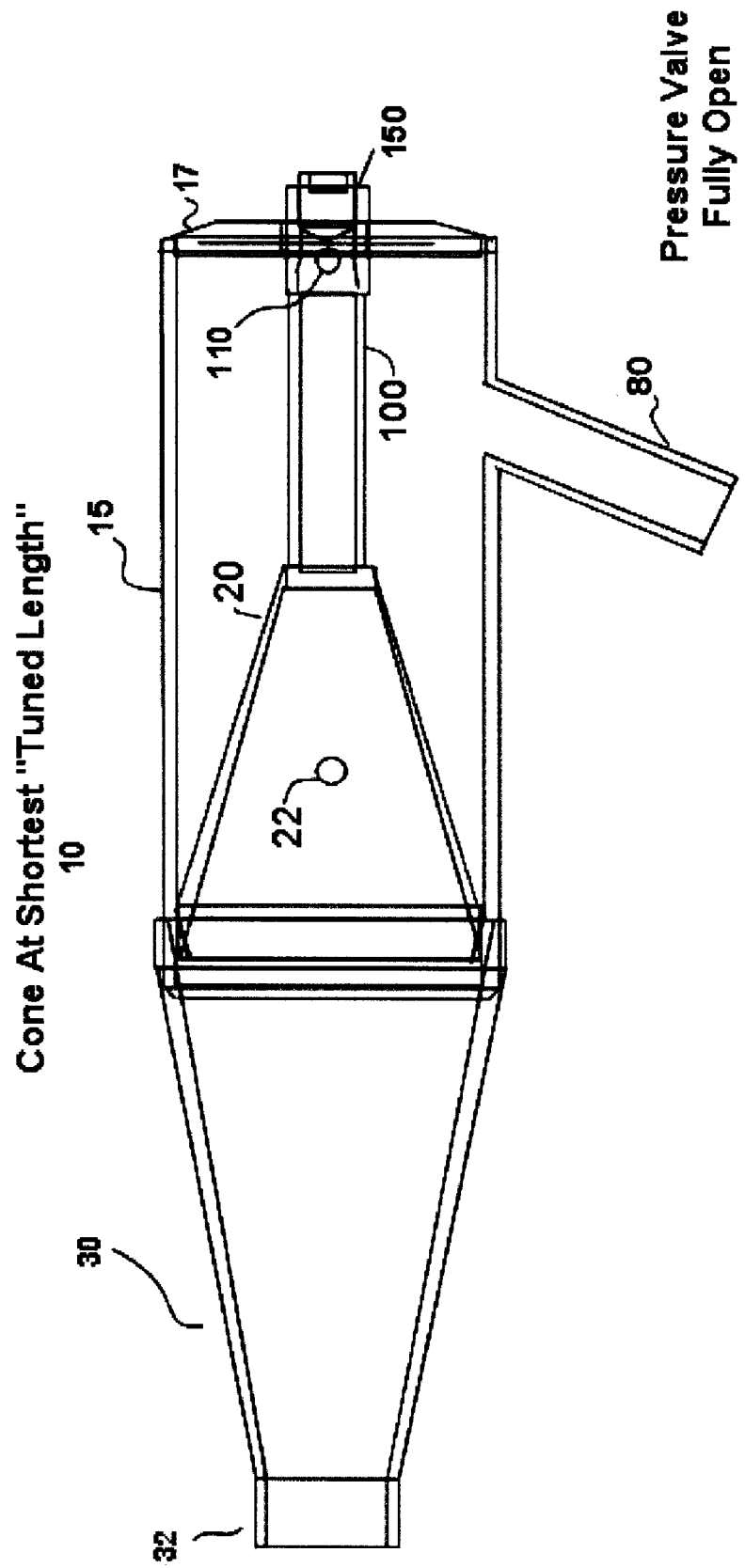
FIG. 3A shows an exemplary embodiment of the instant invention adjusted to a minimum tuned length.

FIG. 2 shows an exemplary embodiment of the instant invention assembled and illustrates the path of exhaust gas through the invention. In the exemplary embodiment, The entire modular tuned pipe 10 is assembled by threaded connections between the various parts, like the exemplary parts shown in FIGS. 1A-1C, allowing the individual components, such as the body portion 15, the convergent cone 20 and the divergent cone 35, to be swapped out with other components of differing dimensions and/or geometries allowing an even further degree of adjustment. This also will allow for the rapid and easy replacement of only one of the components if damage were to occur during use preventing the necessity of disposing of the entire pipe. The use of silicone o-rings may also be included to seal the threaded joints throughout the pipe.

As shown in FIG. 2, the arrows indicate outflowing exhaust gas passing from the motor through the header coupling 32 and into the divergent cone 30. The gas continues along through the divergent cone 30 and into the convergent cone 20 and through the exhaust hole 22. Simultaneously, in this embodiment, gas is permitted to flow down the adjustment screw 100 and through the at least one gas bypass hole 110, depending on the position of the pressure adjustment screw 150. As noted above, the pressure screw and its configuration can be varied in such a way as to allow the pressure to be changed through changes to the at least one gas bypass hole 110 or similar path. The exhaust gas then enters the body portion 15 and through the exhaust port 80 as shown.

FIGS. 3A and 3B show the minimum and maximum tuned length of an exemplary embodiment. As described above, the adjustment screw 100 is turned in FIG. 3A to move the convergent cone 20 closest to the end of the modular tuned pipe 10 having the header coupling 32. In this instance, the pressure adjustment screw is adjusted to allow the at least one gas bypass hole 110 to be partially open. In FIG. 3B, the adjustment screw 100 is turned to move the convergent cone 20 closest to the end of the modular tuned pipe 10 having the end cap 17 or further from the header coupling 32. In this instance, the pressure adjustment screw 100 is adjusted to close the at least one gas bypass hole 110.

Figure 4:
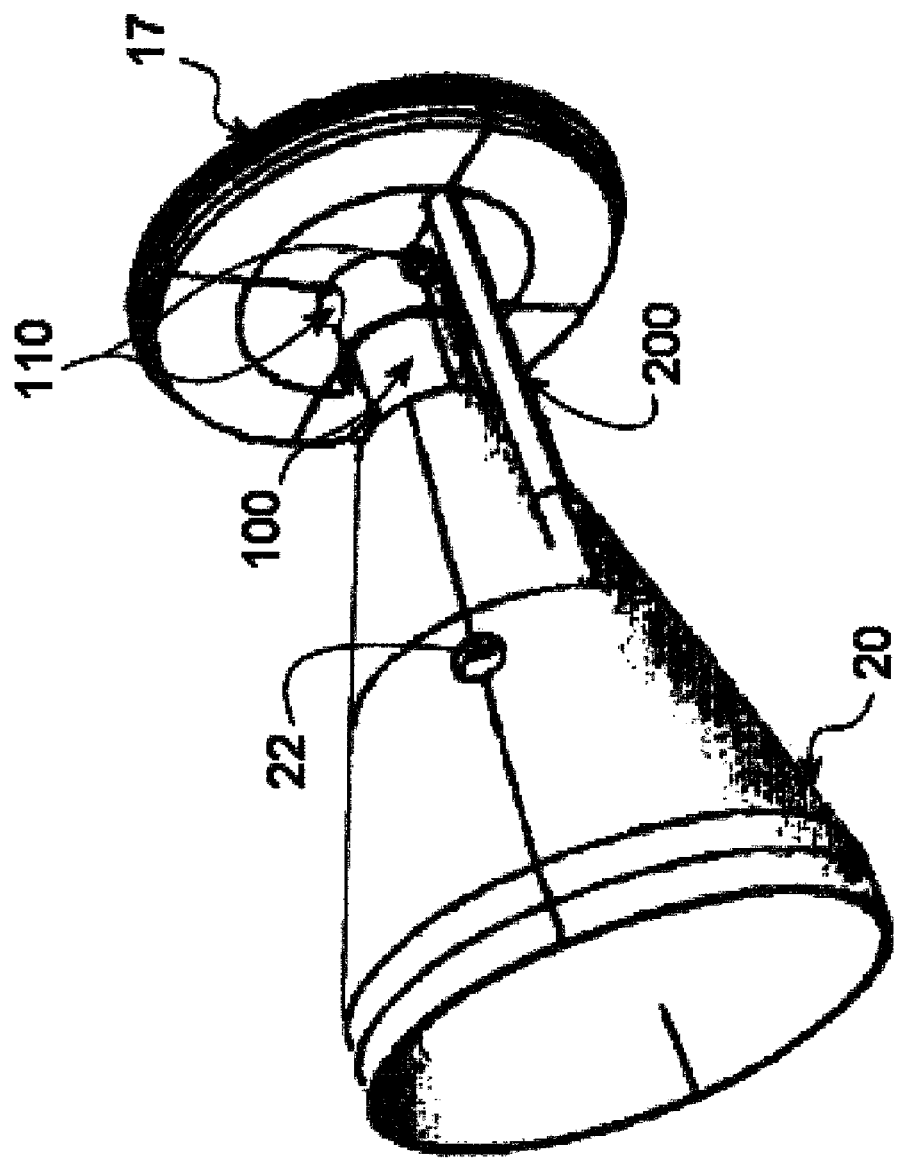
FIG. 4 shows an exemplary embodiment of the instant invention having a stabilizing rod to prevent counter rotation.

FIG. 4 shows an exemplary embodiment of the instant invention having a stabilizing rod to prevent counter rotation. The convergent cone 20 in the exemplary embodiment may, depending on the manner in which it is coupled, have movement whereby it turns with the adjustment screw 100 within the body portion. The convergent cone 20 can be prevented from turning in response to the turning of the adjustment screw 100 by any of several counter rotation mechanisms. One non-limiting example is the use of a rod 200 projecting from the end cap 17 off center of the cap and penetrating the convergent cone 20 thus preventing rotation of the convergent cone 20 in relation to the end cap 17 but allowing it to slide in response to the rotation of the adjustment screw 100.

Similarly, other non-limiting examples such as variations in the geometry of the body portion 10 and convergent cone 20 of shapes other than round, oval for instance, would also allow lateral movement viz-a-vis an adjustment screw 100 but not rotation of the components and may be utilized. Similarly, another non-limiting example is through the use of a rail or ridge attached to the inside of the body portion 10 with a cutout in an outside edge of the convergent cone 20, which could effectively prevent this movement.

The modular nature of the modular tuned pipe together with the external adjustment screw and pressure screw allow for flexibility, ease of use, ease of adjustment and ease of repair in comparison to existing exhaust pipes. it is therefore a significant advance in the state of the art.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A modular tuned exhaust pipe coupled to a remote controlled vehicle having a two stroke motor, comprising:
   a body portion having an exhaust port and an inlet port, a header coupling the body portion to the two stroke motor on the remote controlled vehicle;
   an end cap at an end of the body portion closest to the exhaust port;
   a divergent cone section coupled between the header coupling and the body portion;
   a convergent cone section internally and slidingly mounted within the body portion and having an at least one exhaust hole therein; and
   an external adjustment screw and the adjustment screw is coupled to the convergent cone section such that turning the adjustment screw moves the convergent cone slidingly in a lateral direction within the body portion relative to the divergent cone section to change the tuned length, the distance between the convergent and divergent cones of the exhaust, and thereby the performance characteristics of said two stroke motor.

2. The modular tuned exhaust pipe of claim 1, wherein the body portion, the convergent cone, the end cap, and the adjustment mechanism are releasably coupled together such that they may be quickly disassembled and individual components replaced.

3. The modular tuned exhaust pipe of claim 1, further comprising a set of internal threads on the convergent cone and a set of external threads on the adjustment screw, wherein the internal threads of the convergent cone engage the external threads on the adjustment screw and thereby impart movement on the convergent cone.

4. The modular tuned exhaust pipe of claim 1, further comprising a counter rotation mechanism.

5. The modular tuned exhaust pipe of claim 4, wherein the counter rotation mechanism is a rod, the rod projecting from the end cap off the center of the end cap and penetrating the convergent cone such that the rod prevents rotation of the convergent cone in relation to the end cap but allows the convergent cone to slide within the body portion in response to the rotation of the adjustment screw.

6. The modular tuned exhaust pipe of claim 4, wherein the body portion, end cap, and convergent cone are non-circular and the counter rotation mechanism is the geometry of the body portion and the convergent cone, such that the geometry prevents rotation of the convergent cone in relation to the end cap but allows the convergent cone to slide within the body portion in response to the rotation of the adjustment screw.

7. The modular tuned exhaust pipe of claim 1, further comprising a pressure adjustment screw, the pressure adjustment screw penetrating the body portion such that turning of the pressure adjustment screw increases or decreases the pressure within the modular tuned pipe.

8. The modular tuned exhaust pipe of claim 7, wherein the pressure adjustment screw is adjusted to open or close an at least one bypass hole.

9. The modular tuned exhaust pipe of claim 8, wherein the pressure adjustment screw is contained within the adjustment screw and the adjustment screw has at least one bypass hole, whereby exhaust gasses are permitted to flow down the adjustment screw and through the at least one gas bypass hole and the turning of the pressure adjustment screw closes at least partially or completely the at least one bypass hole within the screw and changes the pressure within the exhaust.

* * * * *